March 3, 1953          J. F. HARVEY          2,630,104
STEAM GENERATOR
Filed May 28, 1947          3 Sheets-Sheet 1
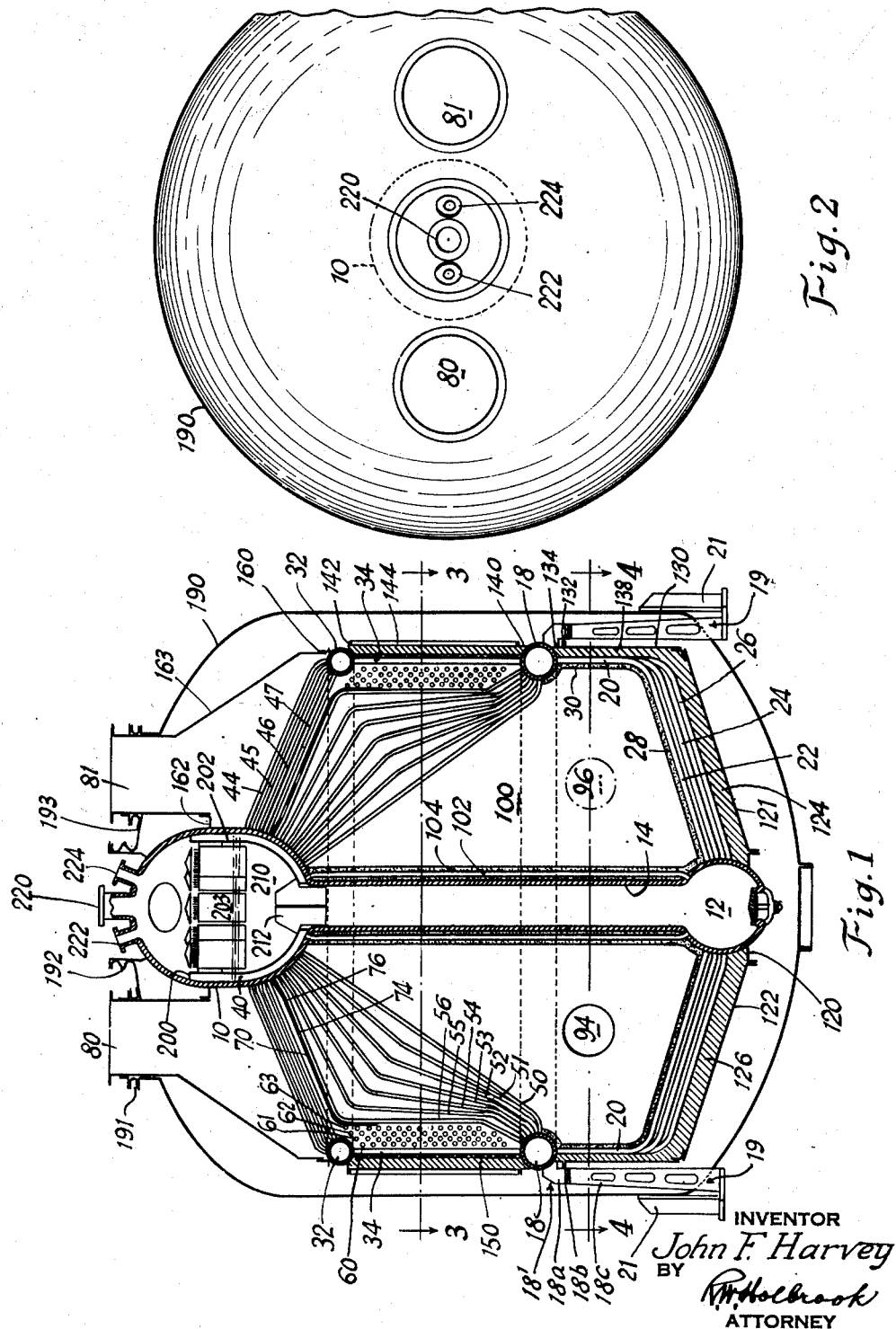
INVENTOR
John F. Harvey
BY
R. W. Holbrook
ATTORNEY INVENTOR
John F. Harvey
BY
M. Holbrook
ATTORNEY

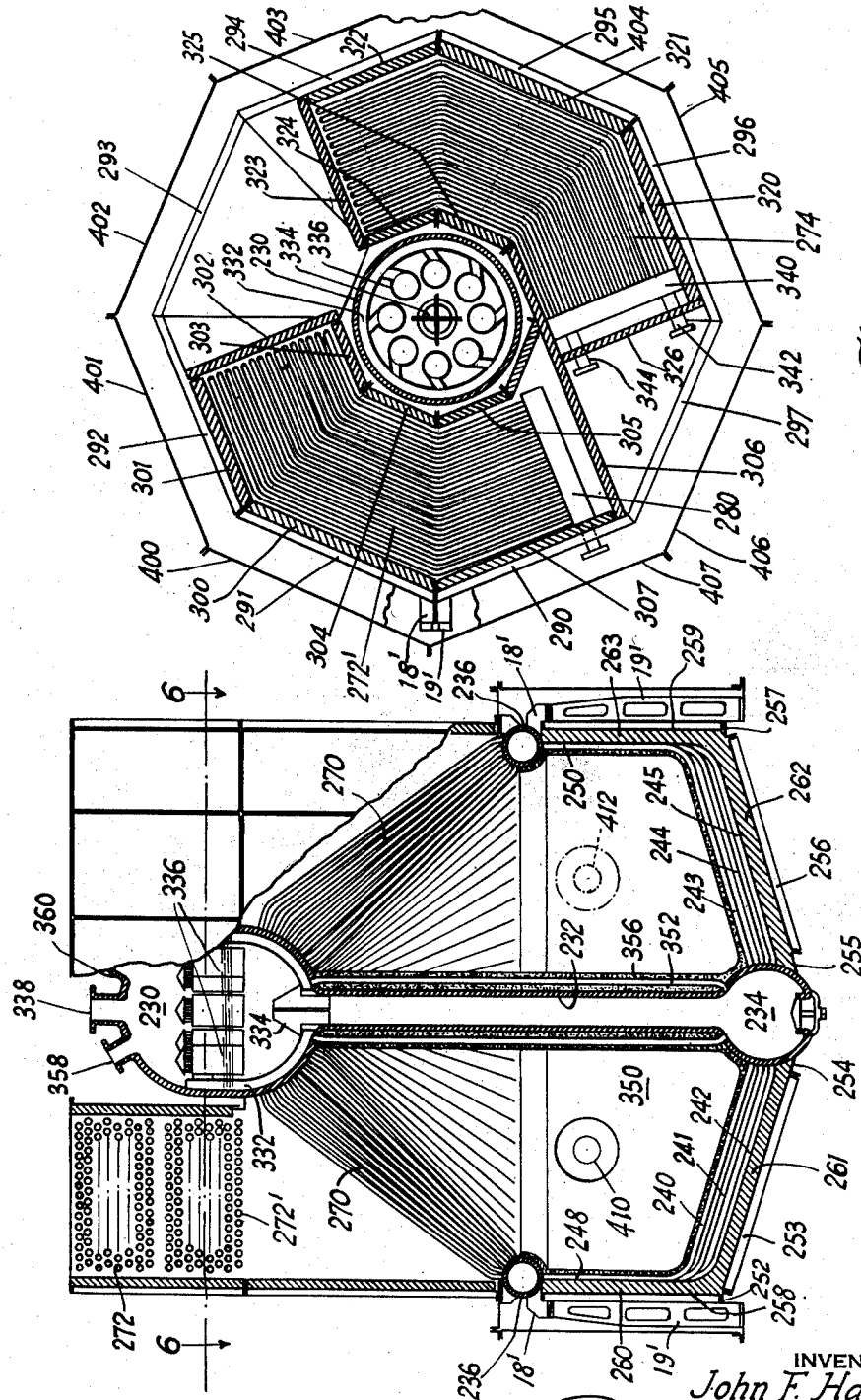

Patented Mar. 3, 1953

2,630,104

UNITED STATES PATENT OFFICE 2,630,104

STEAM GENERATOR

John F. Harvey, Akron, Ohio, assignor to The Babcock & Wilcox Company, New York, N. Y., a corporation of New Jersey Application May 28, 1947, Serial No. 751,067

10 Claims. (Cl. 122—323)

This invention relates to steam generators and more particularly to improvement in water tube steam generators.

An object of the invention is to provide an efficient steam generator for use with the furnace gases at high positive pressures without detracting from the effectiveness of the generator.

A more specific object of the invention is to provide the steam generator characterized by a central circular furnace and a double casing construction with the outer casing shell of pressure constraining shape and construction and having a fixed support for the steam generator and the two casings at a level closely related to the level of the burner for firing the furnace, the two casings being provided with an expansion joint case seal between them at the upper part of the outer casing shell.

It is a further object of the invention to provide a steam generator such as that referred to in the preceding paragraph, having a pressure equalizing connection from the annular space between the outer casing and the shell of the inner casing to the burner supply conduit.

A still further object of the invention is to provide a steam generator of the character specified in the above paragraph and having a refractory casing and inner casing, the purpose of the pressure equalizing connection from the annular space of the outer casing and the shell of the inner casing being to permit operation of the steam generator at super-atmospheric pressure without damage to the refractory and inner casing which would otherwise occur.

Another object of the invention is to provide a steam generator which is entirely self-supporting, and which has a furnace fired in such a manner as to provide an optimum length of furnace gas travel before the gases contact a screen consisting of convection tubes.

A further object of the invention is to provide a steam generator of the above indicated characteristics, and having an annular arrangement of upright steam generating tubes disposed within a casing which is substantially circular, to simplify fabrication, reduce cost, and provide for effective operation at high furnace temperatures.

The manner in which the foregoing objects, and such other objects and advantages as may hereinafter appear or are incident to my invention are realized is illustrated in preferred form in the accompanying drawings, wherein:

Fig. 1 is a vertical section through a steam generator constituting one embodiment of the invention;

Fig. 2 is a top plan of the Fig. 1 steam generator;

Fig. 5 is a vertical section of a similar generator constituting another embodiment of my invention; and Fig. 6 is a horizontal section on the line 6—6 of Fig. 5, showing the arrangement of the economizer tubes.

The illustrative steam generator is preferably of a vertical cylindrical form and, as indicated in Fig. 1, it comprises an upper steam and water drum or chamber 10 which is of circular cross section, and of a shape in the nature of a spheroid. At the lower part of the installation, there is a water chamber 12 of spherical type disposed centrally of the steam generator and directly connected to the water space of the chamber 10 by a large diameter upright downcomer 14.

Figure 4:
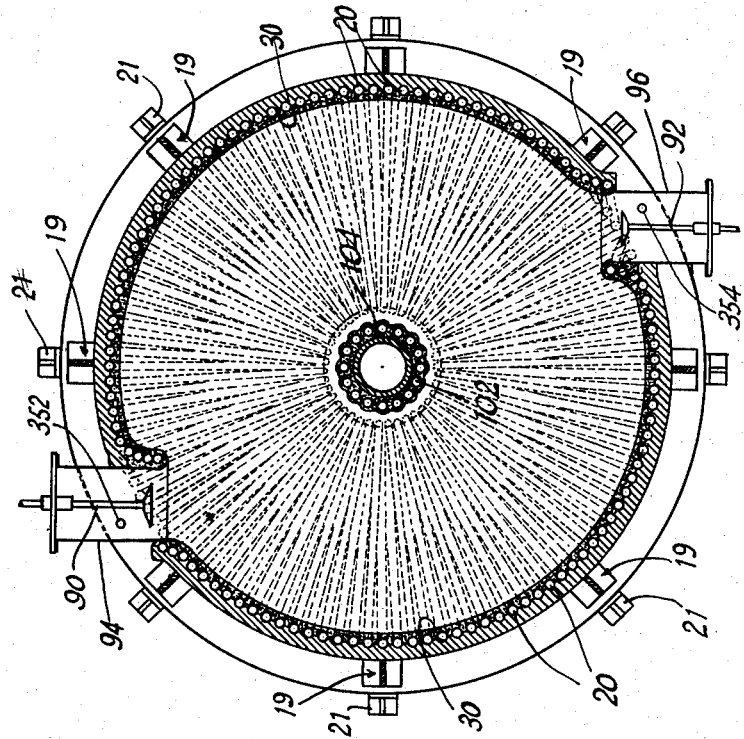
Fig. 4 is a horizontal section through the furnace of the Fig. 1 generator, taken on the section line 4—4 of Fig. 1.

An annular intermediate header 18 is horizontally disposed at a level somewhat above that of the water chamber 12 but below the level of the steam and water chamber 10, as indicated in Fig. 1 of the drawings. This header may be termed an annular header, or ring-shaped header. Communicating with the lower part of this intermediate header and extending downwardly therefrom is an outer ring or furnace wall tubes 20. Their lower parts are inclined downwardly to the water chamber 12 and disposed at different levels as indicated at 22, 24, 26 in Fig. 1. Above the uppermost tubes 22 is a stratum of refractory material 28 which comprises a part of the bottom of the furnace. Similarly, the upper parts of the tubes 20 have the spaces between them closed by refractory material 30 as indicated in Fig. 4, and this refractory material preferably covers the furnace faces of the tubes, as also indicated in Figs. 1 and 4. These tubes preferably have metallic studs welded thereto and extending into the refractory material, this specific structure being similar to that disclosed in the E. G. Bailey Patent 2,268,558, of January 6, 1942.

An upper annular or ring-shaped header 32, of substantially the same radius as the header 18 is disposed as indicated in Fig. 1, near the top of the steam generator. This upper ring header is connected with the lower header 18 by a ring of steam generating wall tubes 34, the spaces between these tubes being closed by flat stud plates 36 welded to the sides of the tubes. Externally of these tubes and their stud plates is a stratum of thermal insulation 37.

The header 32 is connected to the inlet chamber 40 of the steam and water chamber 10 by rings of tubes such as those indicated at 44, 45, 46, and 47.

The inlet chamber 40 of the steam and water drum 10 is also directly connected to the intermediate ring header 18 by a plurality of rings of tubes such as those indicated at 50—56.

Figure 3:
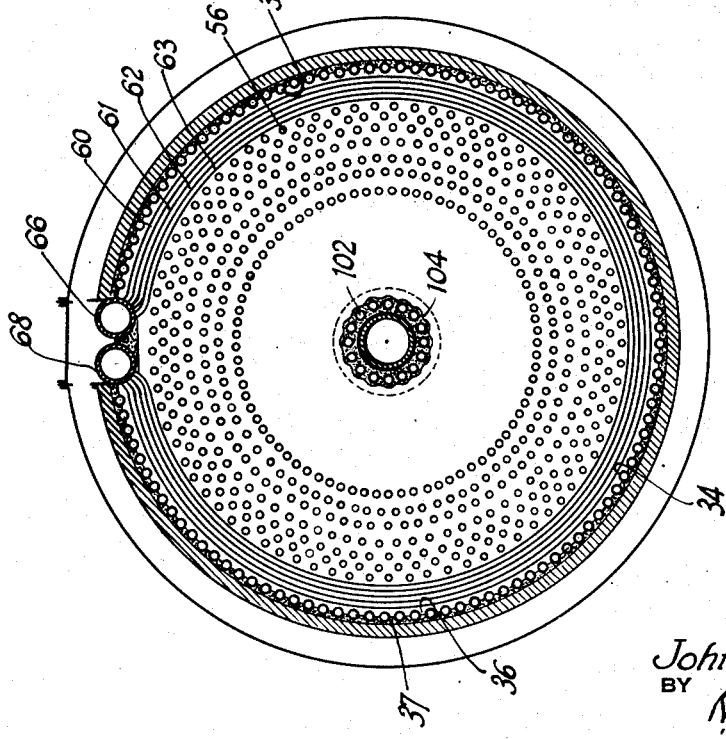
Fig. 3 is a horizontal section taken on the line 3—3 of Fig. 1.

The lower sections of the rings tubes 56 are upright and spaced sufficiently inwardly of the tubes 34 to provide space for the bank of the superheater tubes 60—63. These superheater tubes are connected to an inlet header 66 (Fig. 3) and extend around the installation and through the annular passage between the tubes 34 and tubes 56 to an upright outlet header 68 arranged alongside the inlet header 66. The header 68 is connected by a conduit to steam using equipment.

The upper parts of the outer ring tubes 56 support a ring baffle 70 which extends over the horizontally inclined sections of the tubes 56 and somewhat downwardly on their vertically arranged sections as indicated in Fig. 1. This baffle is preferably provided, at positions adjacent the steam and water drum 10, with a plurality of circumferentially spaced openings such as 74 and 76 which permit part of the furnace gases to pass directly to the outlet flues 80 and 81. The remainder of the gases pass around the lower end of the baffle 70 and upwardly over the superheater tubes. Above the latter the gases pass over the circulators 44—47 and then to the flues 80 and 81.

As means for providing for the flow of heating gases through the annular gas pass formed by the combustion chamber, the furnace is fired by such tangentially disposed burners as indicated at 90 and 92 in Fig. 4, burner openings being provided in the circular wall of the furnace by the burner tubes or casings such as 94 and 96.

Interposed between the downcomer 14 and the annular combustion chamber 100 is an inner ring of wall tubes 102. These tubes have their upper ends connected to the steam and water chamber 10 so as to communicate with its inlet chamber 40. Their lower ends are connected with the water chamber 12, as indicated in Fig. 1, and these tubes are preferably covered by refractory material 104, the combination serving to prevent excessive heating of the downcomers.

The sheet metal casing, or inner shell, of the installation is formed with upright sections as indicated in Fig. 1. At the bottom of the installation, there is an annular casing section 120 secured to the chamber 12 and connected to radially outwardly extending sections 121 and 122 to form the bottom of the casing. Between this bottom of the casing and the lower tubes 26, thermal insulation material is disposed as indicated at 124 and 126.

Secured at the periphery of the bottom of the casing is the annular casing component consisting of upright sections 130 each terminating adjacent the header 18 with intermediate connections 132 to the small casing parts 134, the latter being preferably directly secured to the header 18.

An annular stratum of thermal insulation 138 is disposed between the annular casing component 130, and the upright tube sections 20.

Secured to the upper side of the header 18 is a sheet metal casing ring 140 with a similar ring 142 secured to the upper ring header 32. Secured to the ring sections 140 and 142 are much larger annularly arranged casing sections 144 disposed externally of the tubes 34, with the thermal insulation 150 between these tubes and the casing section 144.

Extending upwardly from the upper side of the ring header 32 is a casing ring 160 which is joined to the casing ring 162 (secured to the steam and water drum 10) by a casing top 163, modified to provide the flues 80 and 81 for the exit of the furnace gases.

The entire installation as above described is enclosed within an outside pressure tight casing 190 with expansion joints 191 and 193 connecting the flues 80 and 81 to the casing while permitting relative axial movement. The casing 190 forms a pressure tight enclosure permitting the steam generator to operate at superatmospheric pressure without damage to the inner casing, or the pressure parts. When the furnace of the installation is operated at superatmospheric pressure the gas pressures within the furnace and within the space between the inner and outer casings (or inner shell, and outer casing) are equalized through the openings 352 and 354 and the burner tubes or casings 94 and 96 (Fig. 4).

The inlet chamber 40 of the steam and water chamber 10 has a top wall as indicated at 200 and the opposite upright walls 202 to which are secured a number of steam and water separators 203 with tangential steam and water inlets. These separators are preferably of a type such as that indicated in the U. S. Patent 2,321,628 to Rowand et al., dated June 15, 1943, and their tangential inlets are connected to the upright wall 202 of the inlet chamber 40. This wall extends downwardly so as to provide an inlet chamber over the entire inlet area of the steam and water chamber 10 with which the steam generating tubes communicate. However, there is an opening at the bottom of the inlet chamber 40 providing for the flow from the water space 210 of the chamber 10 to the downcomer 14. At the top of the downcomer there is a vortex inhibitor 212 preferably including intersecting vertical plates or plates arranged in cross formation and so disposed that the downward flow of water between them is prevented from developing vortex characteristics.

At the top of the steam and water inlet chamber 10 is a steam offtake 220, and on opposite sides thereof there are nozzles 222 and 224 for appurtenances such as safety valves. The steam offtake may be directly connected to a superheater.

The steam generator shown in Figs. 5 and 6, is in its major aspects, similar to that above described. The drum 230 providing the steam and water chamber is of similar construction, and it is connected by the downtake 232 to the water chamber 234. Furthermore, a similar ring header 236 is connected to the water chamber 234 by stud tubes 240—245, in a similar manner. The furnace, furthermore, involves refractory material 248 and 250 on the furnace sides of the tubes 240—245, and the furnace is enclosed by sheet metal casing sections 252—259. Some of these sections provide an octagonal furnace casing. Between these casing sections and the tubes 240—245, there are layers of thermal insulation as indicated at 260—263.

A ring header 236 is directly connected to the lower part of the steam and water chamber 230, by a conically arranged bank of tubes 270. When the installation is supported by the header 236, the tubes 270 act as struts to support the drum 230 and, through it, connected water chamber 234 and the remainder of the installation. The furnace gases after passing over these steam generating tubes, pass over the economizer and the superheater which consist of banks of tubes such as 272 and 274 (Fig. 6) disposed on opposite sides of the steam and water chamber 230. The superheater includes the lower tubes of the bank 272 and the economizer includes the tubes of the bank 274. The economizer and superheater tubes are preferably U-tubes bent as indicated in Fig. 6, to correspond to the polygonal arrangement of the casing sections. There are similar banks of tubes on opposite sides of the steam offtake 338, one entire bank (274) constituting economizer tubes, and the upper part of the bank of tubes 272 on the opposite side of the offtake constituting economizer tubes. The tubes of the remaining part 272' of the latter bank of tubes constitute superheater tubes. The outlet ends of the superheater tubes 272' are connected to an outlet header 280. The inlet ends of these tubes may be connected to an inlet header similar to the outlet header 280 and disposed at a higher elevation. There is an outlet header 340 for the economizer tubes of the bank 274 and a similar inlet header connected to the inlet ends of these tubes. Similar headers are provided for the economizer bank of tubes 272.

The inner sheet metal casing above the ring header 236 is of polygonal cross section (Fig. 6), and includes similar sections 290—297, flanged at their peripheries and united by gas tight joints. This casing construction is advantageous in the effective operation of the steam generator at superatmospheric furnace gas pressures.

The bank of superheater tubes 272 is disposed in a gas pass defined by thermal insulation sections 300—307. Similarly, the bank of economizer tubes 274 are disposed within a flue or gas pass defined by the thermal insulation sections 320—325, 306 and 326. These sections are similarly secured to sheet metal casing sections joined in a gas tight manner to prevent leakage when the installation is operated by furnace gases at pressures above superatmospheric values. As indicated in the drawings, the thermal insulation sections 320—322 are disposed along the surfaces of the casing panels 294—296, and a similar relationship exists with reference to the insulation sections 307, 300 and 301 relative to the casing sections 290—292.

The outlet header 340 and the similar inlet header for the economizer tubes 274 have the nozzle connections 342 and 344 extending through the insulation panel 326.

Suitable closures such as sections of thermal insulation prevent the passage of gases upwardly in the space between the thermal insulation sections 302 and 323 and also between the sections 306, and 326, causing all the furnace gases to pass over the superheater and economizer tubes.

The furnace 350 of the Fig. 5 installation is fired by burners similar to the burners 90 and 92 of Fig. 4 and the downcomer 232 of this installation is enclosed within an inner ring of stud tubes 352 directly connecting the water chamber 234 and the steam and water chamber 230. These tubes are covered by refractory material 356 in a manner similar to that pertaining to the tubes 102 of the embodiment illustrated in Figs. 1 and 2. The steam and water chamber 230 is similarly provided with an inlet chamber 332, vortex inhibitor 334, whirl chamber steam and water separator 336, steam offtake 338, and safety valve nozzles 358 and 360.

The intermediate header 18 indicated particularly in Fig. 1 of the drawings is supported by a plurality of fixed supports preferably comprising the structural pedestal type brackets such as that indicated at 18'. They support the header 18 from an appropriate foundation (not shown) and they are preferably arranged at a plurality of positions around the installation. The brackets 19 involve radially and vertically extending plates 18a preferably welded to the header 18, each bracket also involving a horizontal bearing plate 18b to carry the load to a subjacent flat plate at the top of the upright 18c. With this arrangement of horizontal and vertical plates, radial expansion of the header 18 and associated pressure parts is provided for.

The outer shell 190 is supported by a plurality of structural brackets 21 as indicated in Figs. 1 and 4, these brackets preferably corresponding in number to the brackets 19 and disposed closely adjacent thereto.

With the load of the installation carried by the header 18 and its associated brackets, the load of the upper central steam and water drum 10 with its depending downcomer 14, and the lower drum 12, and other associated pressure parts is carried through the strut action of the combination of the circular row of tubes 34, the circular rows of tubes 50—56, and circulator tubes such as 41—47.

With the above indicated arrangement and with the provision of expansion joint seals such as those shown at 192 and 193 between the outer shell 190 and the flue connections between the inner casing and the upper drum 10, differential movement incurred as a result of different temperatures in the outer shell, and in the pressure parts, is prevented from setting up undesirable stresses in the metal. The lower elliptical section head of the outer shell will, of course, be free to expand downwardly, independently of the expansion movement of the lower portion of the furnace and the pressure parts supported by the header 18.

Appropriate access openings with their closures may be provided in the casing or outer shell 190 to provide access to the heat exchange surfaces of the inner part of the installation.

The steam generator illustrated in Figs. 5 and 6 with its header 236 is supported in a manner similar to that of the support of the header 18 of the Fig. 1 modification. Similar pedestal type brackets 19' support the header 236 from a fixed foundation.

The inner casing of the Figs. 5 and 6 modification with its sections 290—297 is supported by the pedestal type brackets 19', arranged about the installation, and preferably corresponding in number to the number of the casing panels. The manner of supporting the inner casing, and the structure and support of the outer shell or casing are otherwise similar to the corresponding features of the Fig. 1 embodiment, except that the outer shell or casing, comprising the sections 400—407 is of octagonal shape with a number of pedestal supports corresponding to the number of sides. The burner tubes of the Figs. 5 and 6 modification are also likewise so constructed as to provide pressure equalizing connections between the gas spaces within the inner casing and the annular space between the inner and outer casings or shells.

In the Fig. 5 modification it will be noted that the burners, such as 410 and 412 are disposed at an elevation close to the level from which the entire installation is supported. In other words, the burners are horizontally disposed near the level of the header 236. As a result there will be little or no vertical movement of the outer and inner casings at this position and the combustion air supply connection to the burners could be readily made without the necessity for complicated provisions to take care of relative expansion and contraction. The same statement might be made with respect to the burners 94 and 96 of the Fig. 1 modification.

The burners of either of the installations shown are supplied with combustion air under a pressure sufficient to overcome the flow resistance through the furnace, and the connected convection heat absorbing surface. Thus in normal operation the furnace will operate at superatmospheric pressure. Pressure equalizing connections from the annular space between the outer casing shell and the inner casing to the burner air supply conduit prevent flow of gas through the refractory (such as that shown at 260 Fig. 5) and the inner casing, with consequent heat damage. Such pressure equalizing connections are illustrated in Fig. 4. They are provided by the burner tubes 94 and 96 and the openings 352 and 354 therein. As the burner tubes extend across the annular gas space between the inner and outer casings or shells and are open to the combustion chamber within the inner shell, direct communication between the annular gas space between the inner and outer shells and the gas space within the inner shell is provided.

What is claimed is:

1. A steam generator comprising an upright annular combustion chamber having an outer ring of upright steam generating tubes at its outer wall, a water chamber disposed centrally of the combustion chamber and adjacent the bottom thereof, a steam and water chamber centrally disposed with reference to the combustion chamber and adjacent the top thereof, a centrally disposed upright downcomer directly connecting the water chamber to the steam and water chamber, the downcomer and said chambers having concentric circular horizontal cross-sections, a ring of upright steam generating tubes closely adjacent the outer surface of the downcomer and constituting at least a part of the inner wall of the combustion chamber, refractory means closing the spaces between the tubes at said inner wall, fuel burning means in tangential firing relation to the combustion chamber, said outer ring of tubes having their upper ends in communication with the steam and water chamber, a ring-shaped header disposed around the combustion chamber at an elevation above that of the water chamber and having the upper ends of the outer ring tubes connected therewith, the lower portions of the latter tubes inclined downwardly toward the water chamber and connected therewith, said lower portions being arranged as the spokes of a wheel in horizontal plan and extending radially from the water chamber, other steam generating tubes inclined upwardly and directly connecting the header and said steam and water chamber, and means supporting the ring shaped header whereby the remainder of the steam generator is supported.

2. A steam generator comprising an upright annular combustion chamber having a ring of upright steam generating tubes at its outer wall, a water chamber disposed centrally of the combustion chamber and adjacent the bottom thereof, a steam and water chamber centrally disposed with reference to the combustion chamber and adjacent the top thereof, a centrally disposed upright downcomer directly connecting the water chamber to the steam and water chamber, said downcomer being equi-distant from the outer ring of steam generating tubes and acting as the support for the steam and water chamber, fuel burning means operatively associated with the combustion chamber, said outer ring of tubes having their lower ends in communication with said water chamber, an annular header to which the upper ends of said steam generating tubes are connected, upwardly inclined steam generating tubes converging from the header to said steam and water chamber in a conical formation, the latter steam generating tubes extending across the upward flow of furnace gases and establishing circulatory communication between said header and the steam and water chamber, and means supporting the annular header whereby the remainder of the steam generator is supported.

3. A steam generator comprising a central water chamber of circular horizontal cross section, an upper steam and water chamber of circular horizontal cross section, a large diameter downcomer directly connecting said chambers, the downcomer and said chambers having concentric circular horizontal cross-sections, means including steam generating tubes defining the outer wall of an annular furnace disposed around said downcomer, means maintaining a ceramic refractory shield directly enclosing and contacting said downcomer and constituting at least a part of the inner wall of the furnace, an inner shell or casing for the steam generator and its furnace, an outer pressure tight casing spaced outwardly of the inner shell, and means forming a pressure equalizing connection between the furnace and the space between the inner and outer casings.

4. In apparatus in which fluid heat exchange takes place, an outer shell of pressure constraining shape and construction, an inner casing disposed within the outer shell and disposed about a central circular furnace, fluid heat exchange tubes exposed to the heat of said furnace with some of said tubes defining boundaries of the furnace, a burner for firing the furnace, a gas outlet for the furnace, a fixed support for said apparatus at a level closely related to that of the burner, and an expansion joint construction providing a gas pressure seal between the shell and said casing at the upper part of the shell and in the zone of the furnace gas outlet.

5. In apparatus in which fluid heat exchange takes place, a circular outer shell, a circular inner casing disposed within and spaced from the outer shell and disposed about a central circular furnace, fluid heat exchange tubes exposed to the heat of said furnace with some of said tubes defining boundaries of the furnace, a burner for firing the furnace, a gas outlet for the furnace, a tubular burner air supply conduit providing a passage through the annular space between the shell and said casing to the furnace, the burner air supply conduit being constructed to provide a pressure equalizing connection between the furnace and the annular space between said shell and said casing, a fixed support for said apparatus at a level closely related to that of the burner, and an expansion joint construction providing a gas pressure seal between the shell and said casing at the upper part of the shell and in the zone of the furnace gas outlet.

6. A steam generator comprising, a central upper pressure vessel component of circular plan constituting a steam and water chamber, another pressure vessel component constituting lower submerged water chamber of circular plan, a large diameter tubular downcomer directly connecting said chambers, the downcomer and said chambers having concentric circular horizontal cross-sections, an annular furnace disposed around said downcomer, said furnace having a circumscribing outer wall including a row of upright steam generating tubes having their lower ends in communication with said lower chamber, a horizontally disposed annular header positioned at said wall and connected to said circular row of tubes, external support means associated with said header for supporting the steam generator, and a bank of conically arranged steam generating tubes connected at their lower ends to said header and connected at the upper ends to said steam and water chamber to act as strut supports.

7. In fluid heat exchange apparatus, pressure vessel components constituting upper and lower fluid chambers, centrally disposed tubular downcomer means directly connecting the chambers, circumferentially arranged upright vapor generating tubes spaced radially outwardly of the downcomer means to provide a furnace therebetween, said vapor generating tubes constituting at least parts of fluid flow paths from the lower chamber to the upper chamber, an upright cylindrical casing enclosing said tubes and the furnace with the upper chamber extending through the casing, a pressure constraining outer shell enclosing the casing and spaced therefrom, and gas tight pressure sealing constructions between the upper chamber and the casing and between the upper chamber and the shell.

8. In fluid heat exchange apparatus a centrally disposed upper pressure vessel constituting a vapor and liquid chamber, a pressure vessel component constituting a liquid chamber disposed below upper chamber, tubular downcomer means directly connecting said chambers, a substantially circumferentially disposed row of upright vapor generating tubes having their lower ends communicating with said lower chamber, said tubes being spaced outwardly of said downcomer means to define a furnace extending around the downcomer means, an intermediate tubular pressure vessel in the shape of a toroid disposed exteriorly of the vapor generating tubes and at a level above that of the said lower chamber, said toroidal pressure vessel having the upper ends of the vapor generating tubes communicating therewith, load carrying supports for the toroidal header, and a substantially circumferentially extending bank of vapor generating tubes having their upper ends in communication with said upper chamber and their lower ends in communication with said toroidal pressure vessel and acting as load carrying struts.

9. In fluid heat exchange apparatus, a centrally disposed upper pressure vessel constituting a vapor and liquid chamber, a pressure vessel component constituting a liquid chamber disposed below upper chamber, tubular downcomer means directly connecting said chambers, a substantially circumferentially disposed row of upright steam generating tubes having their lower ends communicating with said lower chamber, said tubes being spaced outwardly of said downcomer means to define a furnace extending around the downcomer, an intermediate tubular pressure vessel in the shape of a toroid disposed exteriorly of the vapor generating tubes and at a level above that of the said lower chamber, said toroidal pressure vessel having the upper ends of the vapor generating tubes communicating therewith, a substantially circumferentially extending bank of vapor generating tubes having their upper ends in communication with said upper chamber and their lower ends in communication with said toroidal pressure vessel, and externally disposed supporting means directly associated with said toroidal upper and lower pressure vessels and sustaining the load by association with the toroidal pressure vessel.

10. In a vapor generating unit of the type having centrally disposed upper and lower pressure vessels constituting a vapor and liquid chamber and a liquid chamber and connected by upright tubular downcomer means, and circumferentially arranged steam generating tubes defining a circumferentially arranged furnace about the downcomer means; the combination therewith of an upright cylindrical pressure shell, an inner casing spaced inwardly from the shell at the top and bottom as well as the sides of the latter and enclosing the pressure parts of the unit, a series of circumferentially spaced supports for the unit, the supports extending from an exterior position near the lower end of the shell upwardly to a position within the shell and intermediate the height of the unit, and load sustaining structures associated with the pressure parts of the unit and the tops of the supports for transmitting the load of the unit to the upper parts of said supports.

JOHN F. HARVEY.

REFERENCES CITED

The following references are of record in the file of this patent:

UNITED STATES PATENTS

| Number | Name | Date |
|---|---|---|
| 522,271 | Plunkett | July 3, 1894 |
| 535,115 | Moore | Mar. 5, 1895 |
| 772,789 | Danks et al. | Oct. 18, 1904 |
| 830,138 | Dougherty | Sept. 4, 1906 |
| 959,612 | Rosenthal et al. | May 31, 1910 |
| 1,746,711 | Murray | Feb. 11, 1930 |
| 1,766,989 | Forssblad | June 24, 1930 |
| 1,889,031 | Bell | Nov. 29, 1932 |
| 1,940,578 | Brainard | Dec. 19, 1933 |
| 2,033,767 | Hammer | Mar. 10, 1936 |
| 2,148,484 | Lucke | Feb. 28, 1939 |
| 2,251,014 | Firshing | July 29, 1941 |
| 2,271,639 | Hardgrove | Feb. 3, 1942 |
| 2,271,880 | Wood | Feb. 3, 1942 |
| 2,275,652 | Pursel | Mar. 10, 1942 |
| 2,327,750 | Turner | Aug. 24, 1943 |
| 2,518,459 | Frisch | Aug. 15, 1950 |

FOREIGN PATENTS

| Number | Country | Date |
|---|---|---|
| 469,595 | Great Britain | July 28, 1937 |